Feb. 21, 1961  C. B. REYNOLDS  2,972,356
MULTI-PURPOSE COMBINATION VALVE
Filed March 12, 1959

INVENTOR.
CHARLES B. REYNOLDS
BY
W. H. Maxwell
AGENT

United States Patent Office 2,972,356
Patented Feb. 21, 1961

2,972,356

MULTI-PURPOSE COMBINATION VALVE

Charles B. Reynolds, P.O. Box 619, Orange, Calif.

Filed Mar. 12, 1959, Ser. No. 798,953

5 Claims. (Cl. 137—625.4)

This invention relates to valves generally and more particularly relates to a novel valve structure which may be used to perform a variety of functions. The invention is shown herein as embodied in a combination valve and jet to be employed as a shut off valve, a throttling valve, a jet, and in other ways; and further may be adapted to be packed off to facilitate flushing a fluid conducting system.

This application is filed as a continuation in part of my application entitled, "Improved Combination Valve and Jet," filed March 6, 1956, Serial No. 569,726.

The desirability of having a valve structure such that it may be used to perform a variety of functions is obvious, and to that end I have invented the valve structure disclosed herein.

It is accordingly an object of the invention to provide a valve structure such that a single embodiment may be used to perform a multiplicity of functions.

It is a further object to provide a valve structure capable of many embodiments all of which involve the same inventive concept.

It is a further object to provide a shut off valve which may be adapted to perform other functions as well.

It is a further object to provide an adjusting or throttling valve which may be adapted to perform other functions as well.

It is a further object to provide a combination valve and jet which may be adapted to perform other functions as well.

It is a further object to provide a hydrant or general valve which may be adapted to perform other functions as well.

It is a further object to provide a single valve structure which may be adapted to perform all the functions heretofore set forth and which may also be packed off so as to facilitate flushing of a fluid conducting system.

The various objects and features of my invention will be fully understood from the following detailed description of the typical preferred forms and applications of the invention, throughout which description reference is made to the accompanying drawings, in which.

Figure 1:
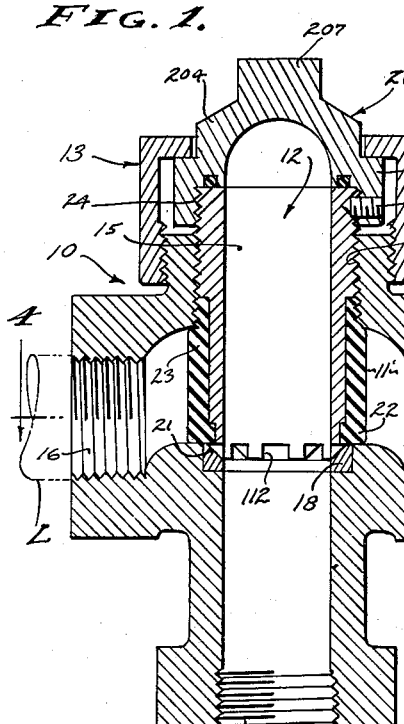
Fig. 1 is a sectional view with portions broken away and illustrating the valve when used as a shut off valve to control fluid flow in or out the lateral openings.

Referring now to the drawings and first to Fig. 1 the numeral 10 generally designates a valve structure in accordance with the invention which may include a valve body 11, a tubular valve plug insert 12, and a retaining ring 13. In the embodiment shown the body 11 is of T configuration and is provided with a bottom opening 14, a top opening 15, and two lateral openings 16 and 17. A bevelled valve seat 18 is provided, and the top opening 15 is internally threaded as indicated at 19.

Figure 6:
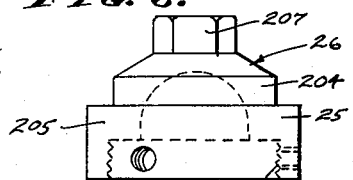
Figure 4:
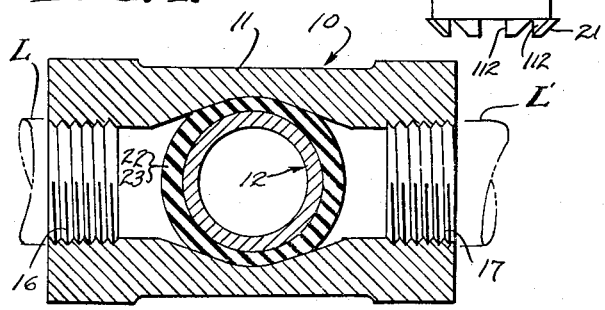
Fig. 4 is a sectional view taken along the line 4—4 of Fig. 1.
Figure 7:
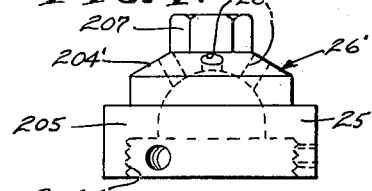

The valve plug insert 12 is preferably tubular and is provided with a bevelled face 21 to have metal to metal engagement with the seat 18 of the body 11. A rubber cushion stop 22 is also provided and a sleeve 23 encircles the plug 12 as indicated in the drawing to engage with and seal with the threads at 19 when the plug 12 is raised. As shown, the stop 22 and sleeve 23 are formed integrally of a body of resilient material preferably rubber, or the like. The stop 22 has a lower face that engages a portion of the seat 18 surrounding the portion thereof engaged by the face 21 of the insert and is somewhat compressed before the sealing faces of the valve are engaged metal to metal, in order to give a cushioning action and in order to expand the stop 22 and sleeve 23. The plug 12 is externally threaded as shown at 24 so as to threadably engage the threads 19 of the body 11. In order that the plug 12 may be retained and adjusted within the body 11, it may be provided with a lateral extension or flange 25, and it has a dome or cover, either an imperforate cover 26 or a perforate cover 26' as shown in Figs. 6 and 7, respectively. Finally, the retaining ring 13 is threaded to the body 11 to lock the plug 12 positioned as clearly shown in the drawing.

When the valve of the present invention is to be used as a shut off valve the lateral openings 16 and 17 are connected with fluid handling lines L and L', while the bottom opening can be closed by a plug P. In this case the valve plug insert 12 is equipped with the imperforate cover 26 that is secured to the insert as later described. Thus, when the insert is lifted, by turning thereof, the fluid is free to flow from one lateral to the other, however, when the insert is lowered the stop 22 and sleeve 23 are compressed to be expanded into engagement with the walls of the chamber 11' that is formed in the body of the valve to accommodate the insert and to handle flow of fluid. Expanding of the stop and sleeve by compressing the same results in closing, or packing off, of the laterals 16 and 17.

Figure 2:
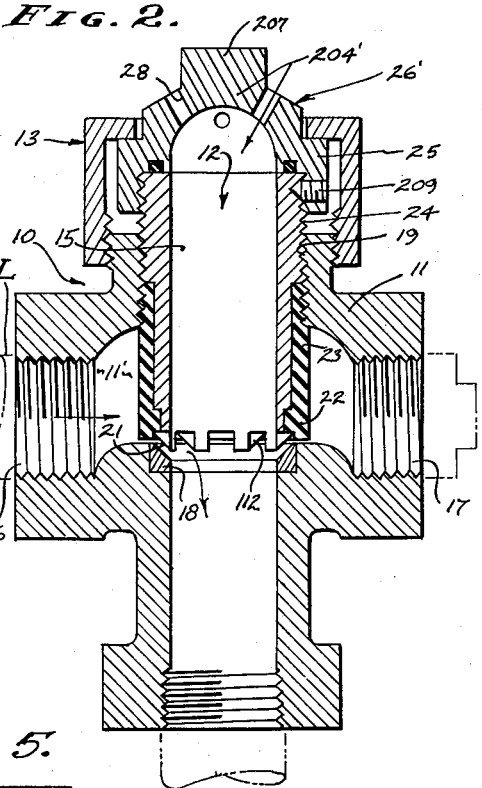
Fig. 2 is a view similar to Fig. 1 showing the valve when adapted to function as a suction valve or a jet.
Figure 3:
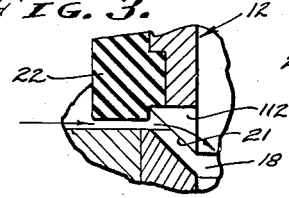
Fig. 3 is an enlarged detailed view of a portion of the structure showing the valve when opened and with the pack-off sleeve disengaged from the seat portion of the valve body.

Referring now to Fig. 2 of the drawings, another use of the valve is illustrated wherein a jet or syphoning action is obtained. That is, the valve of the present invention is shown as it is used, for example, as a mixing valve, in which case one or more of the lateral openings are connected with fluid handling lines L (one lateral opening being shown closed by a plug) and in which case the top and bottom of the valve are used to handle fluid flow. As shown, the bottom opening 14 is connected to a fluid handling line, and the valve plug insert 12 is equipped with the perforate cover 26' that is secured to the insert as later described. Thus, when the insert is adjustably lifted the supply of fluid from the lateral line L enters into the passage within the insert 12 and within the seat 18, and also within the lower portion of the body 10. It will be apparent that a syphoning or mixing action is obtained, drawing fluid into and through the tubular insert through the perforate cover 26'.

The valve plug insert 12 is tubular with a flow passage therethrough and the lower bevelled portion is provided with spaced apart slots 112 to provide for a minimum flow during syphoning operation. The sleeve 23 encircles the insert 12 as indicated in the drawing and with the integral stop 22 forms an expandable element provided for the said pack off purpose to be more particularly described. That is, the element formed by the stop 22 and sleeve 23 is expansible and when compressed by endwise pressure it occupies the chamber within the valve body to close off the lateral openings. However, when the valve plug insert 12 is adjusted to be in spaced relationship to the seat 18, the bottom face of the stop 22 is also spaced from the seat 18 whereby the said element formed by the stop 22 and sleeve 23 is relaxed. That is, the lateral openings 16 and 17 are opened and fluid is free to enter the passages within the insert 12 and body 10 by passing through the slots 112.

Figure 5:
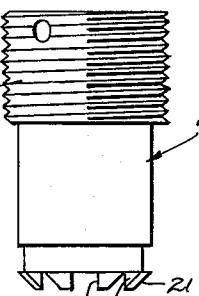
Figs. 5, 6 and 7 are views showing the insert element, the imperforate cover element, and the perforate cover element, respectively, that I provide.

In order to provide for a variety of modifications without departing from the basic concept of the invention the valve plug insert 12 is externally threaded to be threadedly received by the threads 19 in the body 10 and to be threadedly coupled to either cover 26 or 26'. As best illustrated in Fig. 5 of the drawings, the valve plug insert 12 has a lower portion recessed and thereby adapted to hold the element formed by the stop 23 and sleeve 22, and it has an upper portion that is threaded as above described. Further, the periphery of the insert 12 is notched to receive set screws to lock the cover 26 and 26' in operating position.

In Fig. 6 of the drawings I have illustrated the imperforate cover 26. As shown, the cover 26 comprises a circular dome-shaped body 204 that has a circular flange 205 provided with internal threads 206, and characterized by an upstanding hexagon member 207. The threads 206 mate with the threads on the exterior of the insert 12 and in order to lock the parts together suitable locking means in the form of set screws 209 are provided to engage in the above mentioned notches in the insert 12.

In Fig. 7 of the drawings I have illustrated the perforate cover 26'. As shown, the cover 26' is the same, generally, as the cover 26 and is secured in operating position in the same way. However, the cover 26' is provided with openings 28 through the dome-shaped body 204' in order to vent the passage that extends longitudinally through the tubular valve plug insert 12.

Now in order to illustrate the operation of the valve we will assume that the valve illustrated in Fig. 1 is to be adapted for use as a hydrant or as a general valve. In this instance, with the valve plug adjusted to its closed position, the valve may be mounted on a fluid source by means of the internal threads of the opening 14, or, without departing from the scope of the invention, by any other coupling means which may be provided. In this instance it is clear that when the valve plug is lifted, fluid will flow upward through opening 14 and thence outward through the lateral openings 16 and 17. Or, alternatively, the plug P may be used, as shown in Fig. 1, in which case fluid will flow between the openings 16 and 17.

Alternatively, only one lateral opening may be used or provided, the body thus being of L configuration. Then, when either a lateral or bottom opening is attached to a fluid source, and when the valve plug is lifted, fluid will flow into the opening attached to the source and thence through the valve and out the other opening.

Further, it is clear that in any of the alternatives described above the valve may be placed in a line and employed with a pump or any other suitable source of pipe line pressure, and in this instance it is believed to be clear that the valve may be adapted to perform a variety of functions.

In Fig. 2 the openings 28 of the dome 26' provide a means through which to draw fluid and at the same time prevent the entrance of heavy debris. Thus, as illustrated, fluid may be forced into the valve through both lateral openings and when the valve plug is lifted may pass out the bottom opening 14. In this manner a powerful suction is obtained and fluid and debris of small size may be drawn into the body through the openings 28 and may be rapidly discharged through the bottom opening 14.

Further, by adjusting the position of the face 21 of the plug insert 12 with respect to the seat 18 a powerful jet action may be obtained. In this instance, for example, without departing from the scope of the invention, the valve may be used as a burner valve, the combustible fluid being drawn into the body through the openings 28 and intermixed and formed into a fine spray in the area adjacent the face of the plug insert 12 and the seat 18 of the valve and then may be immediately burned in this area or conducted through another conduit to a combustion chamber or area.

From the foregoing it is apparent that the invention provides a valve structure which will accomplish all of the objects hereinbefore set forth.

While I have described the salient features of this invention in some detail with respect to several embodiments, these are to be taken as preferred examples of the same, and it will be apparent and it is contemplated that other modifications may be made within the spirit and scope of this invention, and I do not therefore desire to limit the invention to the exact details shown and described, except insofar as they may be defined by the following claims.

Having described my invention, I claim:

1. A valve of the character described including, a body with a chamber therein and with a top opening a bottom opening and a lateral opening, a seat in the chamber of the body and surrounding the bottom opening, a tubular valve plug insert shiftable in the body to enter the chamber and to engage with the seat and enclosed at its top by a separate cover and having a downwardly opening flow passage aligned with the bottom opening for continuous flow therethrough, means releasably locking said cover on the tubular valve plug insert, and means for adjustably positioning the insert relative to the body and with respect to said seat and comprising a part projecting from the cover and to be engaged by an operating tool.

2. A valve of the character described comprising: a valve body having a chamber therein provided with a top opening, a seat defining a bottom opening, and at least one lateral opening; an open ended tubular valve plug projecting into said chamber, with the inner end of said plug having a valving surface and the plug being screw-threaded in said top opening to mount the plug for movement axially when rotated, to engage and disengage said seat; a cover for said plug having a tool-engageable portion and an annular flange, and being removably fitted on the outer end of said plug; releasable means for locking the cover to the plug for adjustment of the latter by the cover; and a retaining ring screw-threaded on the body to receive the outer portion of said cover and bearing against said cover flange to releasably retain the plug in a selected position of adjustment upon tightening the ring.

3. A valve of the character as embodied in claim 2 wherein said cover is imperforate to close said top opening and enable said plug when disengaged from said seat to permit the flow of fluid through said chamber and said lateral and bottom openings.

4. A valve as embodied in claim 2 wherein said cover is provided with ports and said seat and valving surface of the plug are constructed to co-act in providing an ejector nozzle which, in an open position of said plug, enables fluid to be sucked through said cover ports by a propellant fluid under pressure delivered to said chamber from said lateral opening.

5. A valve of the character described comprising: a valve body having a chamber therein provided with a top opening, a seat defining a bottom opening, and lateral openings at opposite sides of the top and bottom openings; an open-ended tubular valve plug projecting into said chamber, with the inner end of said plug having a valving surface and the plug being screw threaded in said top opening to mount the plug for movement axially when rotated, to engage and disengage said seat; a cover for said plug having a tool-engageable portion and an annular flange, and being removably fitted on the outer end of said plug; release means for locking cover to the plug for adjustment of the latter by the cover; and a retaining ring screw threaded on the body to receive the outer portion of said cover flange to releasably retain the plug in a selected position of adjustment upon tightening the ring; said plug having yieldable sealing means exteriorly thereof and within said chamber, which is urged into sealing engagement with the body around said seat and is expanded into engagement with the walls of said chamber between said top and bottom openings when said plug is engaged with said seat, so as to seal off the lateral openings from each other and from said bottom opening.

References Cited in the file of this patent

UNITED STATES PATENTS

| | | |
|---|---|---|
| 430,042 | Sague | June 10, 1890 |
| 2,380,714 | Winteringham | July 31, 1945 |
| 2,595,012 | Smith | Apr. 29, 1952 |